UNITED STATES PATENT OFFICE.

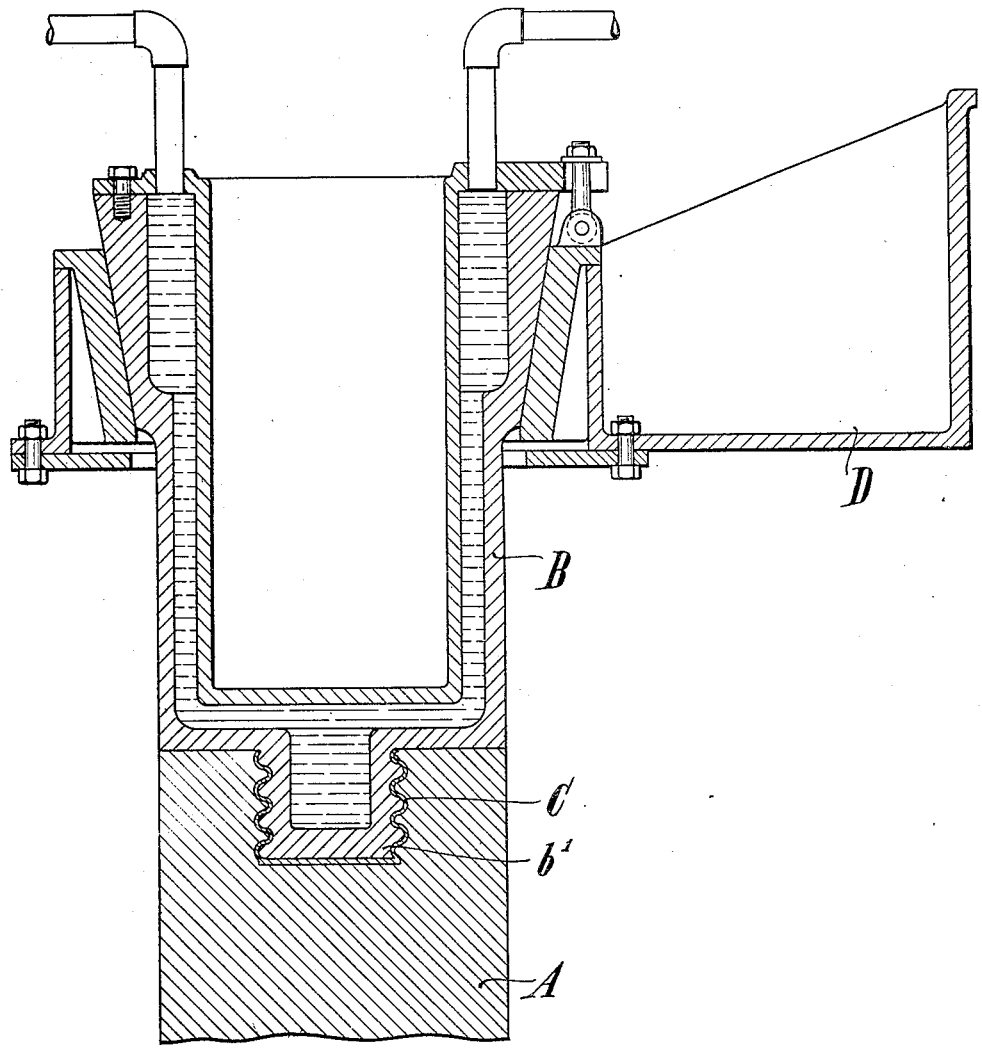

MARTIN SPERLING, OF ESSEN-ON-THE-RUHR, GERMANY, ASSIGNOR TO FRIED. KRUPP AKTIENGESELLSCHAFT, OF ESSEN-ON-THE-RUHR, GERMANY.

ELECTRODE WITH COOLED METALLIC HEAD.

1,408,418.  Specification of Letters Patent.  Patented Feb. 28, 1922.

Application filed August 25, 1913. Serial No. 786,529.

(GRANTED UNDER THE PROVISIONS OF THE ACT OF MARCH 3, 1921, 41 STAT. L., 1313.)

*To all whom it may concern:*

Be it known that I, Dr. MARTIN SPERLING, residing at Essen-on-the-Ruhr, Germany, a subject of the Emperor of Germany, have invented a certain new and useful Improvement in Electrodes with Cooled Metallic Heads, of which the following is a specification.

This invention relates to electrodes with metallic cooled heads and has for its object to provide a readily releasable connection between the electrode and the electrode head, by means of a good conductor of the electric current, whereby at the same time, the undesirable effects of sparking between the electrode and the electrode head will be avoided with certainty.

The accompanying drawing shows an embodiment of the invention designed for electric furnaces, the view being a longitudinal section through the upper portion of the electrode, the electrode head and its support.

With the electrode A of carbon, the metallic head B, cooled through means of water, and preferably constructed as illustrated in the drawing, is connected through means of a threaded tap $b^1$ which is likewise flushed with water, and this threaded tap $b^1$ projects, with play, into a correspondingly threaded recess of the carbon. The intermediate space is filled with an easily fusible metal C, whose melting point is preferably below 100° (centigrade), for example Wood's metal. The electrode head B is mounted in an arm D which can be raised and lowered upon a standard, not shown.

If the contact between the carbon and the metallic filling C, or between the tap $b^1$ and the metal filling C, is incomplete at any point, so that in the passage of the electric current sparks occur, the adjacent metal melts immediately and fills the aperture. The arcing thus ceases immediately before any injury to the thread can occur. If the connection between the carbon and the head B is to be released, the cooling is arrested while the current is flowing. Consequently, a sufficient heating occurs to melt the metal C. The carbon can then be readily unscrewed. The metal C collects in the base of the hollow space of the carbon, and can be used again without loss.

What is claimed is:—

1. An electrode and its head, having a projection on one part entering a recess on the other part, the walls of said projection and recess having a space between them containing a metal whose fusing point is sufficiently low to be fused by the heat developed by the current flowing through the electrode said projection being hollowed out for a cooling fluid in order to normally keep said metal in a solid condition.

2. An electrode having a metallic head; said head constructed with a projection entering the recess of the electrode, and a metal having a fusing point sufficiently low to be fused by the current flowing therethrough, and being provided in the recess around said projection; said head and said projection being hollowed, and means being provided for supplying a cooling medium to said head and projection, thereby normally keeping said metal solid.

3. An electrode having a metallic head connected with the electrode by means of a projection on one part entering a recess on the other, a metal having a fusing point sufficiently low to be fused by the current flowing therethrough and being interposed between said projection and the walls of said recess, and means for cooling said head and projection adapted to be interrupted at will, thereby normally keeping said metal solid.

The foregoing specification signed at Barmen, Germany, this 4th day of August, 1913.

MARTIN SPERLING. [L. S.]

In presence of—
 HELEN NUFER,
 ALBERT NUFER.